(12) United States Patent
Waters

(10) Patent No.: US 11,956,150 B1
(45) Date of Patent: Apr. 9, 2024

(54) PROGRAMMABLE NETWORKING DEVICE FOR PACKET PROCESSING AND SECURITY

(71) Applicant: T-MOBILE INNOVATIONS LLC, Overland Park, KS (US)

(72) Inventor: Brian Waters, Angel Fire, NM (US)

(73) Assignee: T-Mobile Innovations LLC, Overland Park, KS (US)

( * ) Notice: Subject to any disclaimer, the term of this patent is extended or adjusted under 35 U.S.C. 154(b) by 166 days.

(21) Appl. No.: 17/328,269

(22) Filed: May 24, 2021

(51) Int. Cl.
*H04L 45/74* (2022.01)
*H04L 49/00* (2022.01)
*H04L 67/14* (2022.01)

(52) U.S. Cl.
CPC .......... *H04L 45/74* (2013.01); *H04L 49/3063* (2013.01); *H04L 67/14* (2013.01)

(58) Field of Classification Search
None
See application file for complete search history.

(56) References Cited

U.S. PATENT DOCUMENTS

| | | | |
|---|---|---|---|
| 8,165,152 B2 | 4/2012 | Sammour et al. | |
| 8,223,758 B2 | 7/2012 | Eriksson | |
| 8,837,285 B2 | 9/2014 | Sammour et al. | |
| 9,935,937 B1* | 4/2018 | Potlapally | H04L 63/0823 |
| 11,159,576 B1* | 10/2021 | Ly | H04L 63/0245 |
| 11,375,024 B1* | 6/2022 | Waters | H04L 67/14 |
| 11,675,946 B1* | 6/2023 | Waters | H04L 69/22 |
| | | | 703/23 |
| 2015/0092551 A1* | 4/2015 | Moisand | H04L 67/146 |
| | | | 370/235 |
| 2016/0315920 A1* | 10/2016 | Kurmala | H04L 63/0471 |
| 2018/0041470 A1* | 2/2018 | Schultz | H04L 47/24 |
| 2018/0091420 A1* | 3/2018 | Drake | H04L 45/033 |
| 2018/0095915 A1* | 4/2018 | Prabhakar | H04L 67/1097 |
| 2018/0210751 A1* | 7/2018 | Pepus | H04L 63/0209 |
| 2018/0227229 A1* | 8/2018 | Lopez | H04L 45/306 |
| 2018/0279180 A1* | 9/2018 | Lee | H04L 67/14 |
| 2019/0090123 A1* | 3/2019 | Abraham | H04L 67/14 |
| 2019/0182153 A1* | 6/2019 | Gundavelli | H04L 45/64 |
| 2019/0254013 A1* | 8/2019 | Chang | H04L 5/00 |
| 2020/0125389 A1* | 4/2020 | Palermo | G06F 9/5027 |
| 2020/0177550 A1* | 6/2020 | Valluri | H04L 41/0895 |
| 2020/0195495 A1* | 6/2020 | Parker | H04L 41/082 |
| 2020/0196382 A1* | 6/2020 | Kawasaki | H04W 76/38 |
| 2020/0214054 A1* | 7/2020 | Qiao | H04W 48/18 |
| 2021/0021883 A1* | 1/2021 | Parekh | H04N 21/237 |
| 2021/0117360 A1* | 4/2021 | Kutch | G06F 9/5083 |
| 2021/0127271 A1* | 4/2021 | Wu | H04W 28/0842 |
| 2021/0127351 A1* | 4/2021 | Stojanovski | H04W 48/16 |

(Continued)

FOREIGN PATENT DOCUMENTS

WO 2019/238252 A1 12/2019

*Primary Examiner* — Gregory B Sefcheck
(74) *Attorney, Agent, or Firm* — Jones Robb, PLLC

(57) ABSTRACT

Programmable networking devices configured to perform various packet processing functions for packet filtration, control and user plane separation (CUPS), user plane function (UPF), pipeline processing, etc. IPsec is utilized to secure control and data packets traversing the programmable networking device. Field-programmable gate arrays (FPGAs) are configured with one or more host servers and software-based network interfaces (softMAC).

18 Claims, 6 Drawing Sheets

(56) References Cited

U.S. PATENT DOCUMENTS

| | | | | |
|---|---|---|---|---|
| 2021/0385169 A1* | 12/2021 | Urman | .................... | H04L 45/24 |
| 2022/0014475 A1* | 1/2022 | Sun | ................... | H04W 28/0236 |
| 2022/0150166 A1* | 5/2022 | Yang | ....................... | H04L 69/22 |
| 2022/0150683 A1* | 5/2022 | Zhou | ..................... | H04W 60/00 |
| 2022/0174045 A1* | 6/2022 | El-Moussa | .......... | H04L 63/0272 |
| 2023/0179996 A1* | 6/2023 | Preda | ..................... | G06F 21/60 |
| | | | | 726/26 |

* cited by examiner

PROGRAMMABLE NETWORKING DEVICE FOR PACKET PROCESSING AND SECURITY

TECHNICAL BACKGROUND

As communication networks evolve and grow, there are ongoing challenges in communicating data across different types of networks. Different types of networks can include wireless networks, packet-switched networks such as the internet, satellite networks, public/private networks, local area networks (LANs), wide area networks (WANs), and any network enabling communication between different types of electronic devices. Other types of communication networks in various combinations may be envisioned by those having ordinary skill in the art in light of this disclosure. One type of communication network described herein includes telecommunications networks, such as 5G New Radio (NR) networks, 4G LTE networks, etc. Such networks utilize specialized devices, such as gateways, routers, switches, etc. that enable communication between sub-network types, such as radio access networks (RANs), core networks, and so on, as further described herein. Further, data in the order of billions of packets per second traverses modern networks, thus requiring robust packet processing mechanisms that cause excessive signaling between the control and user planes.

4G networks utilized various specialized serving and packet gateways as interfaces for controller nodes to communicate with user-plane nodes (e.g. S-GW and P-GW). A major effort of 5G networks includes control and user plane separation (CUPS) or, in other words, decouple session management from packet processing, 5G networks utilize various servers and functions that communicate over interfaces (e.g. session management function SMF and user plane function UPF devices communicating over N2, N3, N4, etc. reference points). However, these existing user plane functions (UPF in 5G, and user gateways in 4G) combine hardware components programmed strictly for packet processing (such as programmable network switches and devices) having very little processing dedicated towards "management" functions, and external servers or hosts for instructing the network switches how to process the data. Large amounts of data still have to traverse different network nodes in order to be properly routed to their destinations, resulting in extra communication between the switching hardware components and the external hosts/servers. The capacity limitations of existing user plane functions results in lower-than-optimal throughput, which is undesirable for operators of modern communication networks. Thus, there are limitations with existing implementations, particularly with regards to effectively processing large amounts of data and data sessions.

Overview

Exemplary embodiments described herein include programmable networking devices with a plurality of network functions embedded thereon, including packet processing and filtering using Internet Protocol Security (IPsec). One such example of a programmable networking device includes one or more embedded hardware devices configured with a host server (or just "host") enabling communication with other network devices on different interfaces including control and user interfaces. In an embodiment, the one or more embedded hardware devices can include field programmable gate arrays (FPGAs), graphics processing units (GPUs), etc. Further, multiple instances of host server are deployed alongside the one or more embedded hardware devices, all on a single network device. Each host can have its own IP address. Such programmable networking devices can perform various functions including data session management, security/firewall, data processing, pre-processing, post-processing, pipeline processing, and data transport and switching functions. Further described herein are systems including such programmable networking devices, and methods executed by various components in such systems.

An example method performed by one or more programmable networking devices described herein includes receiving a data packet at a programmable network device associated with a first network, identifying a data session associated with the data packet, and based on the identifying, routing the data packet to at least one of a host module on the programmable network device or a pipeline processing circuit embedded on an embedded hardware device coupled to the host module.

A system, comprising a processor, and a memory coupled to the processor, the memory comprising instructions that are executed by the processor to perform operations comprising receiving a data packet at a first FPGA associated with a first network, identifying a data session associated with the data packet, and based on the identifying, routing the data packet to at least one of a host module coupled to the first FPGA or a pipeline processing circuit embedded into the first FPGA.

DETAILED DESCRIPTION

Figure 1:
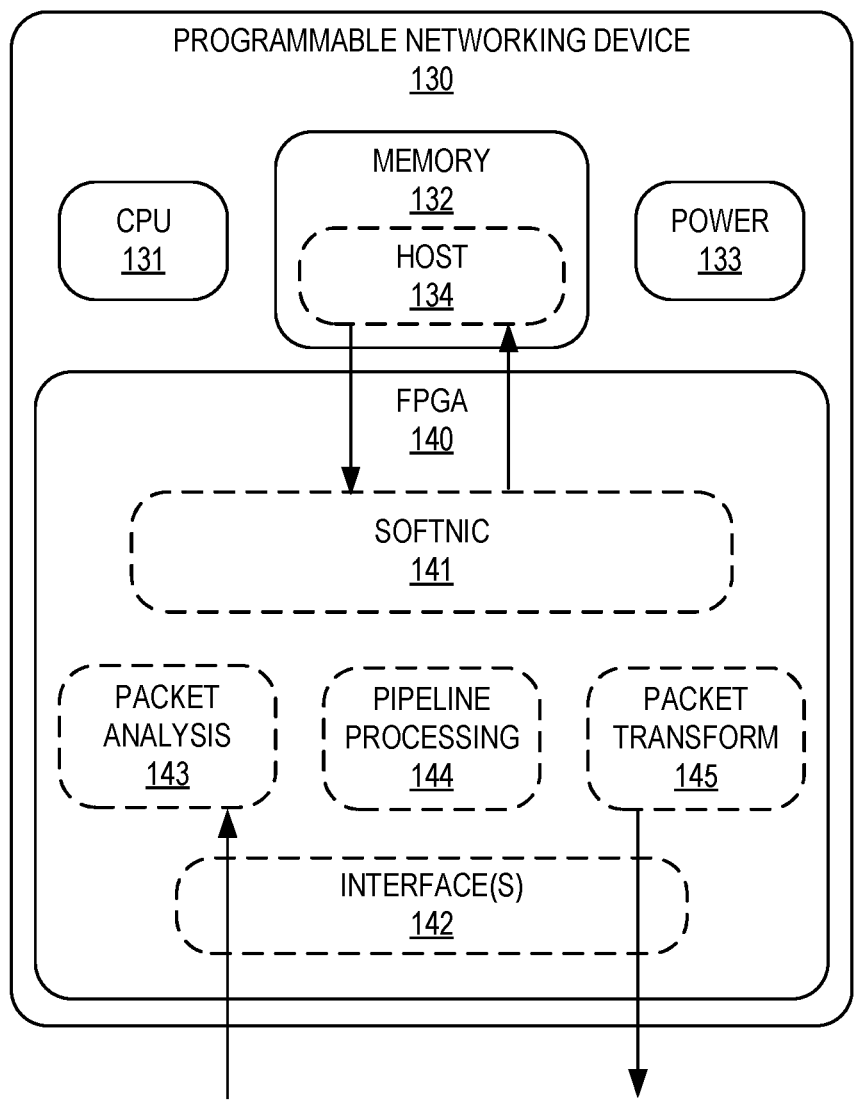
FIG. 1 depicts an example of a programmable networking device.

Embodiments disclosed herein provide programmable networking devices that are configured to secure data packets and data sessions with IPsec while performing pipeline processing on a compact and modular hardware unit to minimize excessive communication while maintaining control and user plane separation (CUPS). The programmable networking device can include one or more processors, memories, and one or more embedded hardware chips, such as a field programmable gate array (FPGA), a graphics processing unit (GPU), or similar. The embedded hardware chips/devices can include one or more network interfaces, or interfaces for transmitting data to different network nodes or devices. In exemplary embodiments described herein, one or more host modules on a memory coupled to a processor can interface between an FPGA programmed with UPF functionality and a control plane network node or gateway. Further, one or more software-based network interfaces (softMAC) embedded on the FPGA can be configured to securely convey data packets to and from the one or more host modules, thereby securing the data packets from network elements external to the FPGA or the programmable networking device itself.

Many diverse uses and implementations can be envisioned for the novel programmable networking devices described herein. Any situation that requires high-speed low-latency packet processing can benefit from these programmable networking devices. In an example embodiment further described in detail herein, such a programmable networking device can perform user plane functions on data packets traversing a mobile network, as well as packet filtration at network edges, deep-packet inspection (DPI), secure fast transfer of transmitting detailed instructions (for high-frequency stock trading, for example), and so on. Deploying the hosts and FPGA in a single (or modular) rack unit enables secure packet processing at line rate. Further, examples of programmable networking devices described herein can be positioned or located at various points within a network topology depending on a network operator's requirement. For example, the programmable networking devices can enhance or replace the myriad existing packet gateways, such as a CUPS based user plane S-GW, P-GW, or SAE-GW in 4G networks, and user plane functions (UPF) in 5G networks. In an exemplary embodiment, a programmable networking device as described herein can be co-located with an access node, such as a gNodeB or eNodeB, such that data flows may directly egress from the user plane at the radio access network (RAN) to the destination network. For example, the programmable networking device can replace a user plane or data plane elements of a system architecture evolution (SAE) gateway in 4G networks, or can replace an intermediate UPF (iUPF) in 5G networks. This eliminates having to transport the data packets to central sites or networks.

In further embodiments described herein, several programmable networking devices can be arranged such that data packets originating from various RANs can traverse minimal other networks or nodes to reach their destination. Incorporating data management functions into these programmable networking devices also minimizes the need for extra control plane elements and communication therebetween. Further, assigning unique IP addresses to plurality of hosts coupled to the FPGA enables to use of IPsec to securely transmit data packets and data sessions associated therewith. Hereinafter for the purposes of this disclosure, the terms "host", "host server", and "server" are considered as interchangeable.

FIG. 1 depicts an exemplary programmable networking device 130. Programmable networking device 130 includes at least a processor 131, a memory 132, a power supply 133, and an FPGA 140. Host server (or "host") 134 is configured to manage data sessions and life cycles associated with data packets that are processed by FPGA 140, and to interface with a control plane network node or gateway. For example, host 134 can receive control-plane instructions from a session management function (SMF), a gateway control plane (SGW-C, PGW-C, or SAEGW-C), or a controller node. Further, host 134 can initiate processes or kernels on the FPGA 140, or interface with persistent kernels, and communicate information about data packets and sessions between the kernels on FPGA 140 and other network elements, such as on the control plane as described above. FPGA 140 can include one or more programmable logic gates and a memory for storing instructions enabling the use of single AND/OR functions to more complex functions that enable use of the FPGA as a comprehensive multi-core processor. Generally, FPGAs can be optimized for particular workloads, e.g. video and imaging, to circuitry for computer, auto, aerospace, and military applications, in addition to electronics for specialized processing and more. FPGAs are particularly useful for prototyping ASICs or processors, and combined with other circuits and/or processing systems or nodes, such as pipeline processing components further described herein. It is to be understood that FPGA 140 can further include components that are not shown herein, but understood as being necessary to execute the functions described below, such as a memory and a processor. The kernels described herein may be programmed using a high-level programming language, such as C++ or equivalent. An abstraction layer similar to oneAPI may be used to build the kernels, enabling the kernels to operate persistently.

In this exemplary embodiment, FPGA 140 is programmed with functions in the form of kernels, including at least softMAC kernel(s) 141, packet analysis kernel(s) 143, pipeline processing kernel(s) 144, and packet transformation kernel(s) 145. For the purposes of this disclosure, a kernel is equivalent to a piece of code that contains executable instructions for specific tasks, including user plane functions. Further, each kernel can communicate with other kernels, and transfer information to and from other kernels. For example, a packet analysis kernel 143 is configured to receive data packets within one or more data streams, and forward the data packets to other kernels, such as softMAC kernel 141, pipeline processing kernel 144, etc. Further, interface(s) 142 can include one or more ports associated with different reference points, or configured to communicate with different network nodes or wireless devices. For example, if programmable networking device 130 is deployed in a mobile network, interface(s) 142 enable communication with access nodes or wireless devices (on the RAN), one or more gateways or functions on the core network, or any other network node on the PDN, including but not limited to application servers, session management, proxy, web server, media server, or end-user wireless devices coupled to another wireless network or RAN. In one embodiment, a programmable networking device can include a first set of ports associated with reference points for data transmission between different network nodes, and a second set of ports associated with reference points for control signal transmission between different network nodes.

In an embodiment, a programmable networking device includes at least a port associated with the N3 reference point, which is used as a data input or output between the programmable networking device and a radio access network or access node within the radio access network. In an embodiment, a programmable networking device includes at least a port associated with the N6 reference point, which is used as a data input or output between the programmable networking device and a packet data network (PDN). In an embodiment, a programmable networking device includes at least a port associated with the N9 reference point, which is used as a data input or output between the programmable networking device and another programmable networking device, such as an intermediate UPF (iUPF) in 5G networks. Further, in an embodiment, a programmable networking device 130 includes at least a port associated with a control signal reference point, such as the N4 reference point, which is used as an input for control signals. For example, as described herein, a management module in a programmable networking device is configured to receive session information from a control gateway (SGW-C or PGW-C) or session management function (SMF), via the port associated with the N4 reference point. The control information received via the N4 reference point includes information related to provisioning a new session (e.g. using the packet forwarding control protocol (PFCP), quality of service information, billing information (including how and when to generate billing records), unique identifiers for a session, and so on. In an embodiment, information received via the N4 reference point enables the programmable networking device to perform session life cycle management. In an exemplary embodiment, in 4G networks, the port is associated with a S1-U or S5/S8-U interface or reference point.

As described above programmable networking device 130 can be configured to perform various packet processing operations, including packet filtering, pipeline processing, routing, etc. For example, packet analysis kernel 143 is configured to parse data packets entering via one or more of interface(s) 142, and determine how to process the data packets. This can include parsing headers, referring to lookup tables, and so on. In one embodiment, packet analysis kernel 143 determines whether an incoming data packet is associated with a data session on the user plane, or with control data. If the data packet is associated with control data (for example, being destined to a controller node such as an SMF), then the packet analysis kernel 143 forwards the data packet to host 134 via softMAC kernel 141. On the other hand, if the data packet is associated with user data (for example, being destined to an external network and/or end-user device), then the data packet is transmitted to pipeline processing module 144. Pipeline processing module 144 can perform various operations including applying quality of service (QoS) policies to data packets traversing the user plane, managing data sessions associated with different rules such as guaranteed bit rate (GBR) and maximum bit rate (MBR) and token buckets associated therewith, synchronizing transmission of data packets and control signals with timers at various operational levels, and so on. Packet transformation kernel 117 may be configured to modify headers and forward data packets to other network nodes, according to the results from pipeline processing kernel(s) 144 and/or instructions from host 134.

An example method performed by programmable networking device 130 can include receiving a data packet at FPGA 140, identifying a data session associated with the data packet, and based on the identifying, routing the data packet to at least one of host module 134 or pipeline processing kernel(s) 144. Routing the data packet to the host 134 can be performed via the softMAC kernel 141. The softMAC kernel 141 provides a software-based network interface, versus a hardware-based network interface (e.g. a hardMAC physical chip), and a customized receiving application on the network interface to send and receive data with host 134. In other words, the softMAC kernel exposes itself to the host 134 as a network interface, which helps avoid network exposure for the other streams of data being processed by the FPGA 140, or for secured data packets transmitted to host 134 and/or other network nodes via host 134. For example, the host 134 can transmit the data packet to a session management function (SMF) via an N4 interface, while maintaining a secure tunnel such as IPsec.

Further, a plurality of host instances can be communicably coupled to the FPGA 140, wherein each host instance is assigned a unique internet protocol (IP) address, and associated with a separate network slice (as described below with respect to FIGS. 5-6). Data packets are secured using IPsec at the softMAC kernel 141, which can also include encapsulating the data packets in an IPsec tunnel associated with the unique IP address for each host 134.

Based on identifying the data session comprises (via, for example, a header of the data packet), it can be determined (by, for example, packet analysis kernel 143) that the data packet is addressed to a second network, and the data packet routed through the pipeline processing kernel(s) 144 and packet transformation kernel(s) 145 to the second network via one or more interfaces 142. For example, the data packet can be routed to the second network via an N6 interface. Further the data packet can be routed to a second FPGA on the second network via an N9 interface. Further, the data packets may be associated with one or more specific interfaces as a condition to securing the data packets using the IPsec protocol. The one or more specific interfaces include one or more of an N3 interface, an N6 interface, or an N9 interface. For example, the data packets can be associated with data sessions transmitted to or from one or more of a radio access network (RAN), a packet data network (PDN), or a second FPGA, each of which communicates with the programmable networking device 130 via the N3, N6, or N9 interfaces respectively from among interfaces 142.

Further in an embodiment, a pipeline process can be broken down and processed sequentially, with multiple sessions being performed in parallel. In one exemplary embodiment, a FPGA 140 comprises 4×100 gb ports, and 4 FPGAs can be provided within a single rack unit. This can provide a theoretical data throughput of 1.6 TB, enabling these programmable networking devices to process data equivalent to today's major urban areas. In an exemplary embodiment, multiple instances of a host 134 may be executed on a single programmable networking device, enabling multiple instances that provide parallel processing functions between different network ports. Further, the one or more specific interfaces include an N4 interface, and the data packets are associated with control data transmitted in between each host instance and one or more SMFs. Thus, control data packets (that are separate from data packets associated with a data session, i.e. on the user plane) are also secured with IPsec. Each host instance can be configured with IPsec, and is assigned a unique internet protocol (IP) address, as further described with respect to FIGS. 3 and 4. Securing the data packets comprises encapsulating the data packets in an IPsec tunnel associated with the unique IP address for each host.

Figure 2:
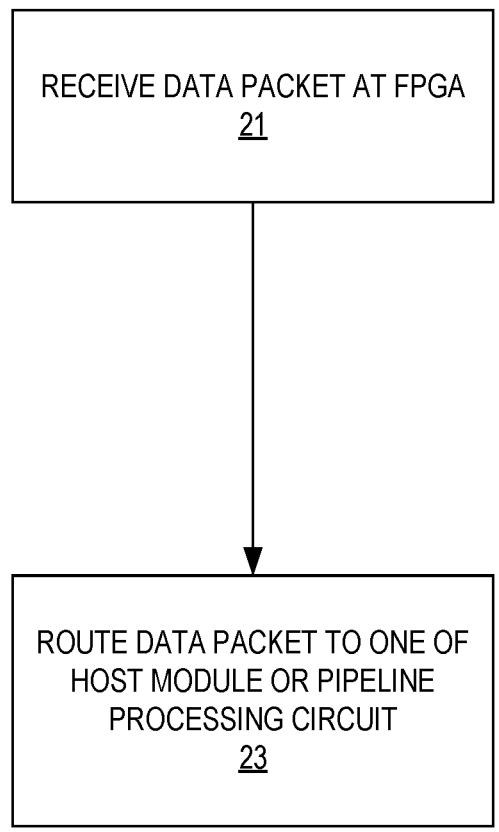
FIG. 2 depicts an example method.

FIG. 2 depicts exemplary operations performed by a programmable networking device. For example, the operations of FIG. 2 may be performed by one or more FPGAs coupled to a host module, similar to programmable networking device 130. Although FIG. 2 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 21, a data packet is received at an FPGA component of the programmable networking device. The data packet may include any type of data packet that is originated from a source node and destined to a destination node. For example, the data packet can include a data packet associated with a data session on a user plane, or a control data packet, and can be received from any type of network node, including an access node, controller node, gateway, external network node, virtual private network (VPN) node, and so on. As described herein, the data packet can be received via one or more different ports, interfaces, or reference points configured on the programmable networking device.

At 23, the data packet is routed to a host module or a pipeline processing circuit. This can include identifying a data session associated with the data packet. Based on identifying the data session (via, for example, a header of the data packet), it can be determined (by, for example, packet analysis kernel 143) that the data packet is addressed to a second network, and the data packet routed through the pipeline processing kernel(s) and packet transformation kernel(s) to the second network via one or more interfaces. For example, the data packet can be routed to the second network via an N6 interface. Further the data packet can be routed to a second FPGA on the second network via an N9 interface. Further, the data packets may be associated with one or more specific interfaces as a condition to securing the data packets using the IPsec protocol. The one or more specific interfaces include one or more of an N3 interface, an N6 interface, or an N9 interface. For example, the data packets can be associated with data sessions transmitted to or from one or more of a radio access network (RAN), a packet data network (PDN), or a second FPGA, each of which communicates with the programmable networking device via the N3, N6, or N9 interfaces respectively.

Routing the data packet to the host can be performed via a software-based network interface and a customized receiving application on the network interface to send and receive data with the host. This helps avoid network exposure for the other streams of data being processed by the FPGA, or for secured data packets transmitted to the host and/or other network nodes via the host. For example, the host 134 can transmit the data packet to a session management function (SMF) via an N4 interface, while maintaining a secure tunnel such as IPsec.

Additional functions performed by exemplary programmable networking devices disclosed herein can include communicating with other network components, such as a controller node, managing health of different network nodes such as eNodeBs, gNodeBs, other components of a UPF, or any network node along the data path, as well as tunnel identification management, session identifier management, and so on. In exemplary embodiments, the programmable networking device receives control-plane instructions from a session management function (SMF) in the case of 5G, and the SGW-C and PGW-C in the case of 4G. Based on the instructions from the controller node, a host module of the programmable networking device can determine how to process the data sessions associated with the data packets it receives. The host module interacts with an embedded circuit such as an FPGA that is programmed to transmit and receive session data, routing tables, and pipeline processing including updating packet headers, applying quality of service (QoS) policies, and forwarding/transporting the data packets associated with the data sessions, based on the information received from the host module.

Figure 3:
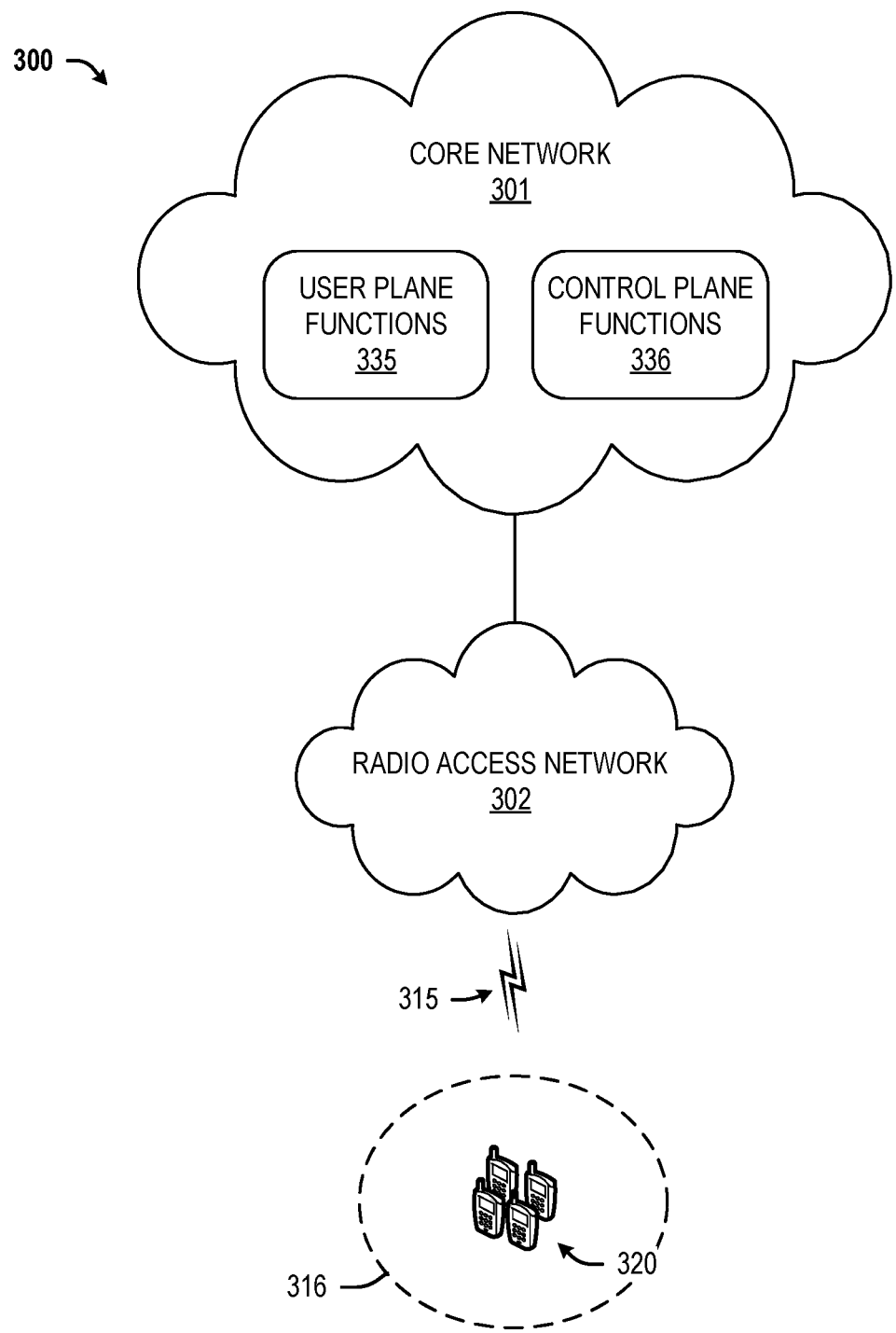
FIG. 3 depicts an example of a system for control and user plane separation.

FIG. 3 depicts an exemplary system 300 for wireless communication, in accordance with the disclosed embodiments. The system 300 may include a core network 301, a radio access network (RAN) 302, and multiple wireless devices 320 capable of communicating with RAN 302 over communication links 315 within a coverage area 316 of RAN 302. The wireless devices 320 may be end-user wireless devices and may be configured to use communication links 315 using 5G NR, 4G LTE, or any other suitable type of communication. The core network 301 may be structured using a service-based architecture (SBA) utilizing core network functions and elements, including user plane functions 335 and control plane functions 336. Service-based interfaces may be utilized between control plane functions 336, while user-plane functions 335 connect over point-to-point links.

The RAN 302 can include various access network functions and devices disposed between the core network 301 and the end-user wireless devices 320. Some of the functions and devices of RAN 302 communicate directly with the core network 301 (e.g. cell site routers and/or programmable networking devices described herein), and others communicate directly with the end user wireless devices 320 (e.g. access nodes). Further, the elements and devices within the RAN 302 can communicate with each other in order to provide services from the core network 301 to the end-user wireless devices 320. For example, the RAN 302 includes at least an access node (or base station), such as an eNodeB and/or a next generation NodeB (gNodeB) communicating with a plurality of end-user wireless devices 320. It is understood that the disclosed technology may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

Access nodes can be, for example, standard access nodes such as a macro-cell access node, a base transceiver station, a radio base station, an eNodeB device, an enhanced eNodeB device, a next generation NodeB (or gNodeB) in 5G New Radio ("5G NR"), or the like. As will be further described below, access nodes may include combinations of centralized units (CUs), distributed units (DUs) and radio units (RUs). In additional embodiments, access nodes may comprise two co-located cells, or antenna/transceiver combinations that are mounted on the same structure. Alternatively, access nodes may comprise a short range, low power, small-cell access node such as a microcell access node, a picocell access node, a femtocell access node, or a home eNodeB device. Access nodes can be configured to deploy at least two different carriers over communication links 315, each of which utilizes a different RAT. For example, a first carrier may be deployed by an access node in an LTE mode, and a second carrier may be deployed by an access node in an NR mode. Thus, in an embodiment, the access node may comprise two co-located cells, or antenna/transceiver combinations that are mounted on the same structure. In some embodiments, multiple access nodes may be deployed and each access node may support a different RAT. For example, a gNodeB may support NR and an eNodeB may provide LTE coverage. Any other combination of access nodes and carriers deployed therefrom may be evident to those having ordinary skill in the art in light of this disclosure. The access nodes can comprise a processor and associated circuitry to execute or direct the execution of computer-readable instructions to perform operations such as those further described herein. Access nodes can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof.

The wireless devices 320 can include any wireless device included in a wireless network. For example, the term "wireless device" may include a relay node, which may communicate with an access node. The term "wireless device" may also include an end-user wireless device, which may communicate with the access node in the RAN 302 via a relay node. The term "wireless device" may further include an end-user wireless device that communicates with the access node directly without being relayed by a relay node. Wireless devices 320 may be any device, system, combination of devices, or other such communication platform capable of communicating wirelessly with RAN 302 using one or more frequency bands and wireless carriers deployed therefrom. Each of wireless devices 320, may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. The wireless devices may be or include high power wireless devices or standard power wireless devices. Wireless devices may also include Internet of Things (IoT) devices. Other types of communication platforms are possible.

System 300 may further include many components not specifically shown in FIG. 3 including processing nodes, controller nodes, routers, gateways, and physical and/or wireless data links for communicating signals among various network elements. System 300 may include one or more of a local area network, a wide area network, and an internetwork (including the Internet). Networks 301, 302 may be capable of communicating signals and carrying data, for example, to support voice, push-to-talk, broadcast video, and data communications by end-user wireless devices 320. Wireless network protocols may include one or more of Multimedia Broadcast Multicast Services (MBMS), code division multiple access (CDMA) 1×RTT (radio transmission technology), Global System for Mobile communications (GSM), Universal Mobile Telecommunications System (UMTS), High-Speed Packet Access (HSPA), Evolution Data Optimized (EV-DO), Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5G New Radio ("5G NR"), or 5G LTE). Wired network protocols utilized by networks 301, 302 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). System 300 may include additional base stations, controller nodes, telephony switches, internet routers, network gateways, computer systems, communication links, or other type of communication equipment, and combinations thereof.

Other network elements may be present in system 300 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between the RAN 302 and the core network 301.

Figure 4:
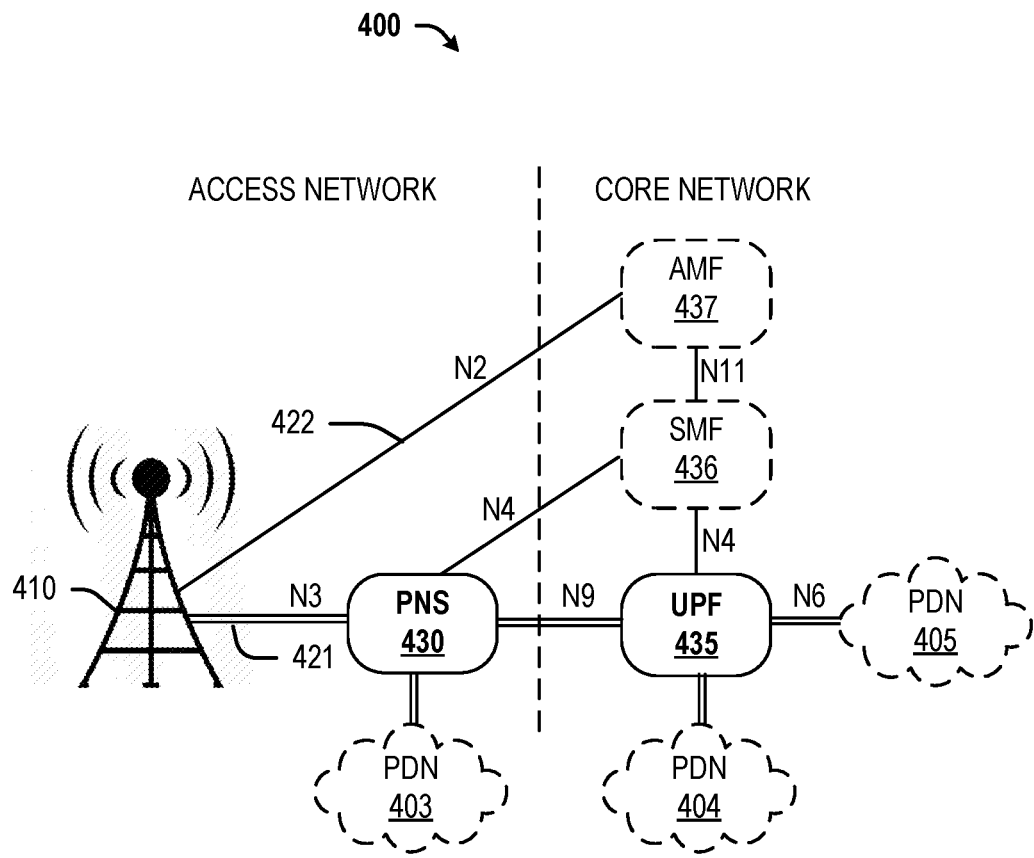
FIG. 4 depicts an example implementation of one or more programmable networking devices in a 5G network.

FIG. 4 depicts exemplary programmable networking devices 430, 435 implemented in a 5G system. The components of exemplary system 400 include at least an access node 410, which can include a gNodeB as described above with reference to RAN 302. Further, the programmable networking devices 430 and 435 can be similar to the programmable networking device 130. For example, programmable networking devices 430, 435 can include a processor, a memory, and a FPGA or equivalent device that is configured to perform the various packet processing functions described herein. Such a programmable networking device may comprise multiple hardware circuits and software modules associated with the different types of functions, all of which are incorporated into a single hardware unit, such as a rack-mountable unit. One or more host modules in each of programmable networking device 430, 435 can interface between an FPGA programmed with and other network elements, such as a control plane network node or gateway. Further, one or more software-based network interfaces (softMAC) embedded on the FPGA can be configured to securely convey data packets to and from the one or more host modules, thereby securing the data packets from network elements external to the FPGA or the programmable networking device itself.

The programmable networking devices 430, 435 can be positioned or located at various points within a network topology depending on a network operator's requirement. For example, the programmable networking device 435 is configured as a UPF, performing user plane functions on data packets traversing system 400. As described herein, programmable networking device (UPF) 435 can enhance or replace the myriad existing packet gateways, such as a CUPS based user plane S-GW, P-GW, or SAE-GW in 4G networks, and user plane functions (UPF) in 5G networks. Further, programmable networking device 430 is configured to perform packet filtration at network edge of the access network and packet data network 403. For example, packet data network 403 can be a private network requiring deep-packet inspection (DPI) for packets traversing thereto/therefrom, or secure fast transfer of transmitting detailed instructions (for high-frequency stock trading, for example), and so on. Thus, programmable networking device 430 can be co-located with access node 410, such that data flows may directly egress from the user plane at the radio access network (RAN) to the destination packet data network 403. This eliminates having to transport the data packets to central sites or networks, while providing robust and secure filtration of network edge of packet data network 403.

For the purposes of this embodiment, data packets associated with data sessions, e.g. payload, etc., traverse system 400 via the user plane 421, while data packets associated with control signals (to manage the data sessions) are transmitted via the control plane 422. For example, the AMF 437 can receive connection requests from one or more wireless devices via access node 410, and manages tasks associated with connection or mobility management, while forwarding session management requirements over an N11 interface to the SMF 436. Meanwhile, the SMF 436 is primarily responsible for interacting with the decoupled data plane 421, creating updating and removing Protocol Data Unit (PDU) sessions and managing session context with a User Plane Function (UPF), which in this embodiment, is replaced with a programmable networking device 435.

Further, each programmable networking device 430, 435 can include one or more ports that are associated with different reference points. For example, programmable networking devices 430, 435 can include a first set of ports associated with reference points for data transmission between different network nodes, and a second set of ports associated with reference points for control signal transmission between different network nodes. This can include at least a port associated with the N3 reference point, which for example is used as a data input or output between the programmable networking device 430 and access node 410. Further, programmable networking devices 435 includes at least a port associated with the N6 reference point, which is used as a data input or output between the programmable networking device and PDN 404/405. Further, the programmable networking devices 430, 435 include at least a port associated with the N9 reference point, which is used as a data input or output between other programmable networking devices not shown herein. Further, the programmable networking devices 430, 435 include at least a port associated with a control signal reference point, such as the N4 reference point, which is used as an input for control signals via control plane 422. For example, as described herein, a server or host module in programmable networking device 430, 435 is configured to receive session information from SMF 436, via the port associated with the N4 reference point. The control information received via the N4 reference point includes information related to provisioning a new session (e.g. using the packet forwarding control protocol (PFCP), quality of service information, billing information (including how and when to generate billing records), unique identifiers for a session, and so on.

Thus, several programmable networking devices can be arranged such that data packets originating from various RANs and core networks can traverse minimal other networks or nodes to reach their destination. Incorporating data management functions into these programmable networking devices also minimizes the need for extra control plane elements and communication therebetween. Since it is beneficial to have the user plane co-located (or as close as network architecture allows) to the access node, and then directly egress from that user plane to the destination network (e.g. PDN 403), this configuration reduces or eliminates extraneous transport of data through the core network. Certain specialized applications that need to have connectivity close to the the access network benefit from this implementation, since the user plane 421 need not be traversed all the way into the core network. Certain application servers may be accessible such that services corresponding to these application servers can be accessed directly, in contrast with other network nodes that may only be accessible via combination of PDN 403 and programmable networking device 430. This is beneficial for edge-deployment of network services, versus other network nodes that are only accessible via PDNs 404/405.

Figure 5:
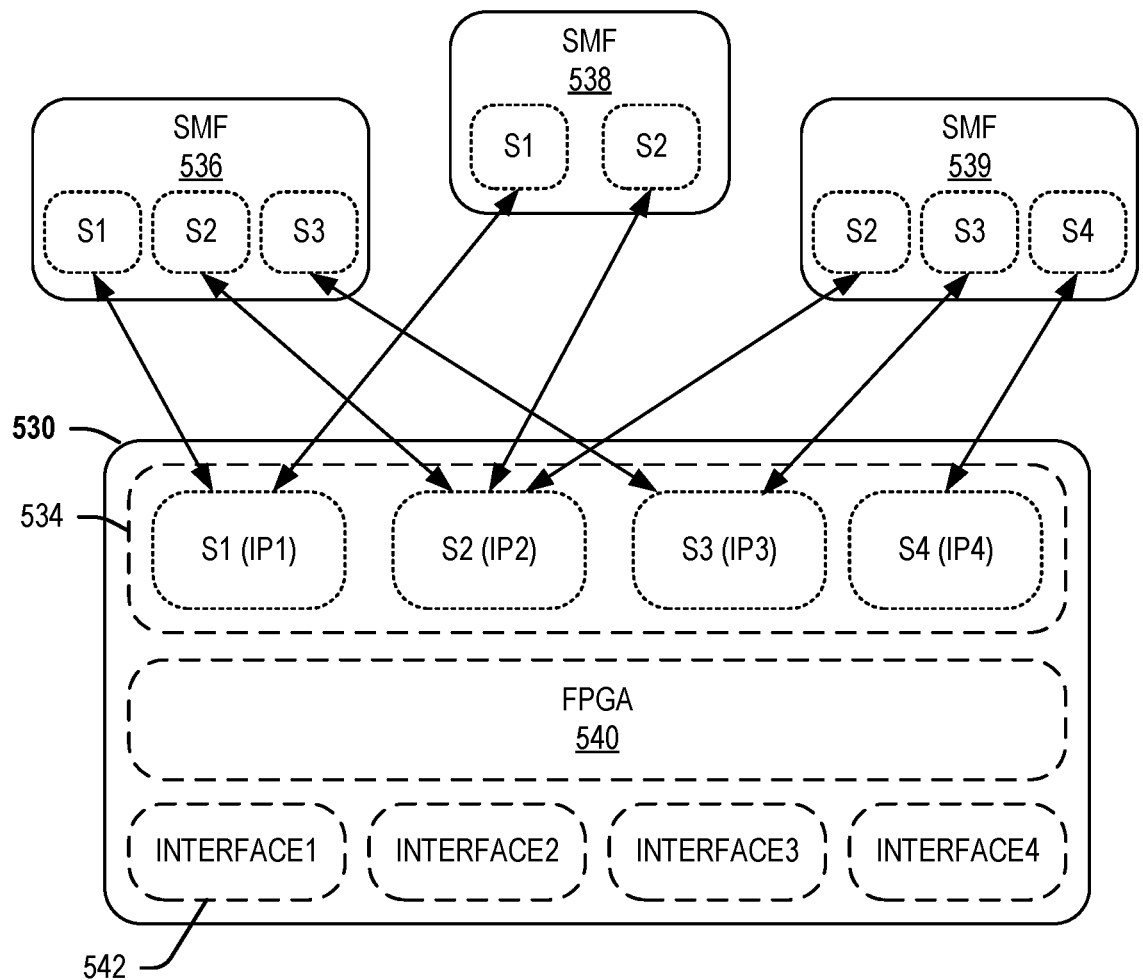
FIG. 5 depicts an example of a programmable networking device comprising a plurality of hosts.

FIG. 5 illustrates an exemplary programmable networking device 530 comprising with a plurality of virtual host instances 534 coupled to an FPGA 540, as further described herein. Not illustrated herein (for simplicity's sake) are additional components that will be understood as being included, such as a processor, memory, etc. Further, in one example, these components can be housed within a modular housing of the programmable networking device 530, such as one or more rack-mountable units (RU). As described herein, such a programmable networking device 530 can be used to perform network slicing, especially in 5G networks. For example, each virtual host instance 534 can be configured to communicate with one or more SMFs 536-539, and transmit data sessions associated with different network slices. To each SMF 536-539 (and to any other external network node), each host instance 534 appears to be a different or separate UPF node. This is enabled by configuring each host instance 534 with a different network address, such as IP addresses IP1-IP4 respectively. Slice information is generally transmitted throughout a 5G radio access network and core, but typically not transmitted to UPF nodes. This is because, generally in the signaling to UPF (via N4) there is nothing related to network slicing. Thus, each UPF slice (S1, S2, S3, etc.) appears to be a separate UPF from the perspective of SMFs 536-539. Further, each different SMF maintains slice information related to sessions associated with each slice S1, S2, S3, etc.

In an embodiment, FPGA 540 can be programmed with functions in the form of kernels, including at least a softMAC kernel, a packet analysis kernel, a pipeline processing kernel, and packet transformation kernel, as described above. For example, a packet analysis kernel is configured to receive data packets within one or more data streams associated with a network slice S1-S3, and forward the data packets to other kernels on FPGA 540, such as a softMAC kernel configured to transmit the data packets in a secure manner to SMFs 536-539. Further, interface(s) 542 can include one or more ports associated with different reference points, or configured to communicate with different network nodes or wireless devices. For example, if programmable networking device 530 is deployed in a mobile network, interface(s) 542 enable communication with access nodes or wireless devices (on the RAN), one or more gateways or functions on the core network, or any other network node on the PDN, including but not limited to application servers, session management, proxy, web server, media server, or end-user wireless devices coupled to another wireless network or RAN, and SMFs 537-539.

Figure 6:
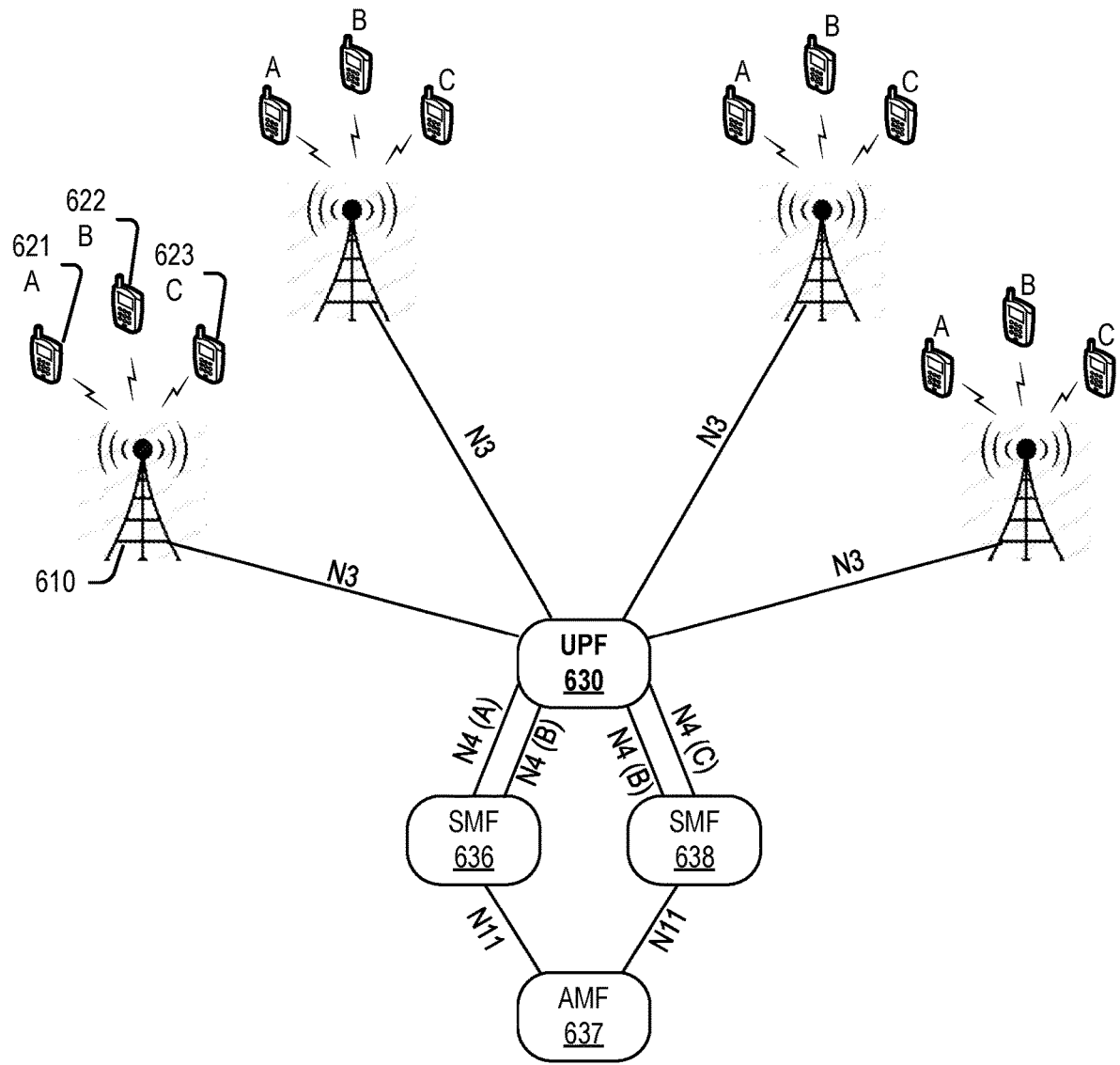
FIG. 6 depicts another example implementation of one or more programmable networking devices in a 5G network.

FIG. 6 illustrates a programmable networking device 630 that is similar to programmable networking device 130. For example, programmable networking device 630 includes a plurality of host instances configured to communicate with one or more SMFs (e.g. SMFs 636, 638) and transmit data sessions associated with different network slices, and configured with a different network address, such as an IP address. Further illustrated are a plurality of access nodes, e.g. access node 610, each coupled to a plurality of wireless devices, e.g. wireless devices 621, 622, 623. Further, at least three network slices are illustrated as being depicted by the letters A, B, and C. For example, a first network slice is provided between wireless device 621 and SMF 636, a second network slice is provided between wireless device 622 and one (or both) of SMF 636, 638 and a third network slice is provided between wireless device 623 and SMF 638. Data sessions within each network slice are secured using IPsec. The data packets may be associated with one or more specific interfaces as a condition to securing the data packets using IPsec. The one or more specific interfaces include one or more of an N3 interface (e.g. between access node 610 and programmable networking device 630), an N6 interface, or an N9 interface. Further, control data associated with each network slice and transmitted between programmable networking device 630 and one or both of SMFs 636, 638 is also secured with IPsec. For example, each host instance with a unique internet protocol (IP) address communicates with SMFs 636, 638 via an N4 interface, and securing the data packets comprises encapsulating the data packets in an IPsec tunnel associated with the unique IP address for each host.

Various embodiments have been disclosed for utilizing a programmable networking device, such as a FPGA, for user plane function, whereby user data packets are processed within a single device without having to be transmitted to and from other network nodes for processing. Exemplary programmable networking devices are programmed using a high-level programming language, such as C++, and can utilize commercially available hardware in novel configurations as described herein, such as a small-footprint (1 rack unit) server with up to 1.6 Tb raw throughput. Thus, a single UPF device is interoperable with multiple SMFs provided by different network operators or vendors, via for example the N4 interface as needed. Such programmable networking devices can deliver QoS support (e.g. MBR enforcement, GBR compliance, downlink DSCP marking, etc.), as well as UPF network slicing by configuring logically separate UPF's for the N4 interface on a single server, while utilizing an FPGA as a common resource across the slices. Each network slice can be configured to support predefined rules for quality of service enforcement (QER), forwarding action (FAR), usage reporting (URR), etc., and can further focus on separate processing of IP multimedia system (IMS) versus regular internet user traffic. Further, a plurality of host instances can be communicably coupled to each FPGA, wherein each host instance is assigned a unique internet protocol (IP) address, and associated with a separate network slice. Data packets are secured using IPsec at the softMAC kernel, which can also include encapsulating the data packets in an IPsec tunnel associated with the unique IP address for each host.

In light of this disclosure, it will be evident to those having ordinary skill in the art that any specialized circuits including FPGAs, ASICs, and other types of processors, can be configured to perform the pipeline processing, auxiliary processing (i.e. pre and post processing), and data management operations, so long as they are in direct communication with each other and incorporated within a small 1-2 unit network node, thereby mitigating the need for extraneous communication across different network nodes in different geographical regions. Further, the exemplary embodiments described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

The invention claimed is:

1. A method, comprising:
receiving a data packet at an embedded hardware device of a programmable network device associated with a first network, the programmable network device including a host module including multiple host instances, each host instance assigned a unique internet protocol (IP) address, the host instances managing data sessions for data packets processed by the embedded hardware device and a pipeline processing circuit embedded on the embedded hardware device coupled to the host module, wherein the programmable network device comprises a single rack unit housing the host module and embedded hardware device;
identifying, at the embedded hardware device, a data session associated with the data packet;
based on the identifying, determining, using a packet analysis kernel of the embedded hardware device, if the data packet is associated with control data or user data;
upon determining, by the packet analysis kernel of the embedded hardware device that the data packet is associated with control data, using a software based network interface embedded on the embedded hardware device to encapsulate the data packet in an IPsec tunnel associated with the unique IP address for a corresponding host instance and routing the data packet to the host module on the programmable network device; and
upon determining, by the packet analysis kernel of the embedded hardware device that the data packet is associated with user data, routing the data packet to the pipeline processing circuit embedded on the embedded hardware device coupled to the host module on the single rack unit.

2. The method of claim 1, further comprising routing the data packet from the pipeline processing circuit to a packet transformation kernel located on the embedded hardware device and configured to forward the data packet to another network node.

3. The method of claim 2, further comprising modifying a data packet header and forwarding the data packet to another network node from the packet transformation kernel.

4. The method of claim 1, wherein the host module transmits the data packet to a session management function (SMF) via an N4 interface.

5. The method of claim 1, further comprising securing the data packet using IPsec and securely conveying the data packet to the host module such that the data packet is secure from network elements external to the programmable networking device.

6. The method of claim 1, wherein identifying the data session comprises inspecting a header of the data packet.

7. The method of claim 1, further comprising:
determining that the data packet is addressed to a second network; and
routing the data packet from the pipeline processing circuit to the second network.

8. The method of claim 7, further comprising routing the data packet to the second network via an N6 interface.

9. The method of claim 8, further comprising routing the data packet to a second embedded hardware device on the second network via an N9 interface.

10. The method of claim 1, wherein the embedded hardware device comprises at least of a field-programmable gate array (FPGA) or a graphics processing unit (GPU).

11. A system, comprising:
a processor; and
a memory coupled to the processor, the memory storing a host module including multiple host instances, each host instance assigned a unique internet protocol (IP) address, the host instances managing data sessions for data packets processed by a field programmable gate array (FPGA) coupled to the host module wherein the FPGA and the host module are housed on a single rack unit, and instructions that are executed by the processor to perform operations comprising:

receiving a data packet at the FPGA associated with a first network, the FPGA including an embedded a pipeline processing circuit;

identifying, at the FPGA, a data session associated with the data packet;

based on the identifying, determining, using a packet analysis kernel of the FPGA, if the data packet is associated with control data or user data;

upon determining, by the packet analysis kernel of the FPGA that the data packet is associated with control data, using a software based network interface embedded on the FPGA to encapsulate the data packet in an IPsec tunnel associated with the unique IP address for a corresponding host instance and, routing the data packet the host module; and upon determining the data packet is associated with user data, by the packet analysis kernel of the FPGA, routing the data packet to the pipeline processing circuit embedded on the FPGA coupled to the host module on the single rack unit.

12. The system of claim 11, wherein the operations further comprise routing the data packet from the pipeline processing circuit to a packet transformation kernel located on the embedded hardware device and configured to forward the data packet to another network node.

13. The system of claim 12, the operations further comprising modifying a data packet header and forwarding the data packet to another network node from the packet transformation kernel.

14. The system of claim 11, wherein the host module transmits the data packet to a session management function (SMF) via an N4 interface.

15. The system of claim 11, wherein the operations further comprise securing the data packet using IPsec and securely conveying the data packet to the host module such that the data packet is secure from network elements external to the programmable networking device.

16. The system of claim 11, wherein identifying the data session comprises inspecting a header of the data packet.

17. The system of claim 11, wherein the operations further comprise:

determining that the data packet is addressed to a second network; and routing the data packet from the pipeline processing circuit to the second network.

18. The system of claim 17, the operations further comprising routing the data packet to the second network via an N6 interface.

* * * * *